United States Patent
Kaneko et al.

(10) Patent No.: US 9,187,829 B2
(45) Date of Patent: Nov. 17, 2015

(54) SURFACE-TREATMENT SOLUTION FOR ZINC OR ZINC ALLOY COATED STEEL SHEET AND METHOD FOR MANUFACTURING ZINC OR ZINC ALLOY COATED STEEL SHEET

(75) Inventors: Rie Kaneko, Tokyo (JP); Takeshi Matsuda, Tokyo (JP); Akira Matsuzaki, Tokyo (JP); Yasuhide Oshima, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/344,140

(22) PCT Filed: Sep. 12, 2012

(86) PCT No.: PCT/JP2012/005792
§ 371 (c)(1),
(2), (4) Date: Mar. 11, 2014

(87) PCT Pub. No.: WO2013/038663
PCT Pub. Date: Mar. 21, 2013

(65) Prior Publication Data
US 2014/0342180 A1    Nov. 20, 2014

(30) Foreign Application Priority Data
Sep. 14, 2011  (JP) .................................. 2011-201174

(51) Int. Cl.
| | |
|---|---|
| *C23C 22/62* | (2006.01) |
| *C23C 22/74* | (2006.01) |
| *B32B 15/04* | (2006.01) |
| *B32B 15/18* | (2006.01) |
| *B05D 3/00* | (2006.01) |
| *C09D 5/08* | (2006.01) |
| *B05D 3/02* | (2006.01) |
| *C23C 22/60* | (2006.01) |

(52) U.S. Cl.
CPC . *C23C 22/62* (2013.01); *B05D 3/00* (2013.01); *B05D 3/02* (2013.01); *C09D 5/08* (2013.01); *C09D 5/082* (2013.01); *C09D 5/084* (2013.01); *C09D 5/086* (2013.01); *C23C 22/60* (2013.01); *C23C 22/74* (2013.01); *C23C 2222/20* (2013.01); *Y10T 428/12569* (2015.01)

(58) Field of Classification Search
CPC ........ C23C 22/60; C23C 22/62; C23C 22/64; C23C 22/74; C23C 30/00; C23C 30/005; C23C 2222/20; Y10T 428/12569
USPC ........................... 428/624, 626, 632, 633, 659
See application file for complete search history.

(56) References Cited

U.S. PATENT DOCUMENTS

2012/0208043 A1* 8/2012 Matsuda et al. .............. 428/623

FOREIGN PATENT DOCUMENTS

| | | |
|---|---|---|
| JP | 10-67844 A | 3/1998 |
| JP | 2001-181860 A | 7/2001 |
| JP | 2001-234358 A | 8/2001 |
| JP | 2001-271175 A | 10/2001 |
| JP | 2002-053979 A | 2/2002 |
| JP | 2002-053980 A | 2/2002 |
| JP | 2002-105658 A | 4/2002 |
| JP | 3302677 B2 | 4/2002 |
| JP | 2003-013252 A | 1/2003 |
| JP | 2003-155452 A | 5/2003 |
| JP | 2003-171778 A | 6/2003 |
| JP | 3549455 B2 | 4/2004 |
| JP | 2004-183015 A | 7/2004 |
| JP | 2004-263252 A | 9/2004 |
| JP | 3596665 B2 | 9/2004 |
| JP | 2005-048199 A | 2/2005 |
| JP | 2006-213958 A | 8/2006 |
| JP | 2007-177314 A | 7/2007 |
| JP | 2008-169470 A | 7/2008 |
| JP | 2010-255105 A | 11/2010 |
| JP | 2011-117070 A | 6/2011 |
| KR | 10-2011-0083742 | * 7/2011 |
| TW | 201024459 | 7/2010 |
| TW | 201042083 | 12/2010 |
| TW | 201122156 | 7/2011 |
| WO | WO 2011/052701 | * 5/2011 |

OTHER PUBLICATIONS

Machine Translation, Sato KR 10-2011-0083742, Jul. 2011.*
Taiwanese Office Action dated Mar. 7, 2014 along with English Translation.
Taiwanese Office Action dated Nov. 7, 2014 along with English Translation from corresponding Taiwanese Application No. 101133655.
Office Action of corresponding Chinese Application No. 201280044359.8 dated Feb. 12, 2015 with English translation.
Korean Office Action dated Jul. 1, 2015 of corresponding Korean Application No. 10-2014-7009481 along with its English translation.
Japanese Office Action dated Aug. 4, 2015 of corresponding Japanese Application No. 2011-201174 along with its English translation.

* cited by examiner

*Primary Examiner* — Michael E La Villa
(74) *Attorney, Agent, or Firm* — DLA Piper LLP (US)

(57) ABSTRACT

A zinc or zinc alloy coated steel sheet has a surface-treatment film formed thereon in a coating weight per one surface of 100 to 600 mg/m$^2$. The surface-treatment film is obtained by applying, onto a surface of the zinc or zinc alloy coated steel sheet, the surface-treatment solution prepared by mixing the following components at specific ratios, the surface-treatment solution having pH of 8 to 10: a silane compound (A) having a hydrolyzable group, obtained from a silane coupling agent (a1) having a glycidyl group, a tetraalkoxysilane (a2), and a chelating agent (a3); a zirconium carbonate compound (B); a vanadate compound (C); a nitric compound (D); and water, and by subsequently heating and drying the surface-treatment solution thus applied.

2 Claims, No Drawings

SURFACE-TREATMENT SOLUTION FOR ZINC OR ZINC ALLOY COATED STEEL SHEET AND METHOD FOR MANUFACTURING ZINC OR ZINC ALLOY COATED STEEL SHEET

TECHNICAL FIELD

This disclosure relates to an environmental-conscious zinc or zinc alloy coated steel sheet for use in automobiles, household electric appliances, building materials, and the like, having a surface-treatment film formed on a surface of the zinc or zinc coated steel sheet, the surface treatment film being free of controlled pollutants such as hexavalent chromium, a method of manufacturing the zinc or zinc alloy coated steel sheet, and a surface-treatment solution. In particular, this disclosure relates to a zinc or zinc alloy coated steel sheet having good electromagnetic wave shielding properties (electrical continuity) as well as corrosion resistance and weldability, that is suitably applied to applications such as electric/electronic equipment in which electromagnetic interference (EMI) needs to be prevented.

BACKGROUND

Along with the accelerated digitalization of household electric appliances and increase in CPU speed in recent years, there has increasingly been a public concern about problems of electromagnetic interference that adversely affect peripheral equipment and human bodies. In view of these problems, "Voluntary Control Council for Interference by Information Technology Equipment (VCCI)" has been established in Japan and there has increasingly been a tendency that the relevant industries voluntarily impose controls on the EMI problems to comply with regulations of VCCI. Examples of such voluntary control may include a technology of enclosing an electronic substrate or the like in an electric/electronic appliance by a shield box formed of a metallic (conductive) material to shield electromagnetic wave to suppress electromagnetic noise generated from the electronic substrate.

The shield box is adapted to shield against electromagnetic wave by reflecting the electromagnetic wave by a conductive material forming the shield box. The higher conductivity of the material forming the shield box results in the higher reflectance of the electromagnetic wave, thereby increasing the electromagnetic wave shielding properties. For this reason, it is important that the metallic sheet forming the shield box has high conductivity to ensure good electromagnetic wave shielding properties of a shield box.

Further, a shield box, which is generally manufactured by forming a metallic sheet, tends to have discontinuous portions (such as seams and junctions) therein and be susceptible to leakage and intrusion of electromagnetic wave through the discontinuous portions. In view of this, a shield box generally has a conductive gasket inserted in the discontinuous portions, to thereby prevent leakage and intrusion of electromagnetic wave.

In this regard, to further ensure shielding properties of the shield box, the shield box needs to be configured to allow desired current to pass through/across the entire shield box. However, the contact portion between the above-mentioned metallic body and the gasket is generally low in contact pressure, whereby the electrical continuity between the metallic body and the gasket (which will be simply referred to as "continuity" hereinafter) is inferior and thus an amount of current passing through the contact portion is relatively small. Therefore, it is important to ensure good continuity between the metallic body and the gasket, in addition to ensuring good conductivity of the metallic sheet itself constituting the shield box, in terms of further improving the performance of the shield box.

Meanwhile, electric and electronic equipments are used under various environments nowadays. Hence, a material constituting a shield box is required to be corrosion resistant, i.e., to exhibit good corrosion resistance even under severe usage environment. Further, a shield box may be spot-welded in the forming process, and thus required to have stable weldability to ensure high productivity.

Conventionally, there has been widely applied, to a steel sheet for use in household electric appliances, building materials, and automobiles, a zinc or zinc alloy coated steel sheet having undergone a chromate treatment for the purpose of improving corrosion resistance (white rust resistance, red rust resistance), the chromate treatment using a treatment solution containing, as a main component, chromic acid, dichromic acid or the salts thereof.

As described above, a metallic body (steel sheet) constituting a shield box is required to have relatively high conductivity and, in particular, exhibit good continuity with respect to a gasket. In this regard, a coating film formed on the steel sheet by chromate treatment can exhibit good rust resistance even if the coating film is relatively thin, which provides good weldability, despite the coating film being inferior in conductivity than the base steel sheet. That is, a surface-treated steel sheet subjected to chromate treatment can attain conductivity equivalent to a (non-surface treated) steel sheet by making a less conductive coating film thereof as thin as possible, to sufficiently ensure good continuity of the shield box with respect to the gasket. As a result, good rust resistance and weldability can be attained along with the good electromagnetic wave shielding properties. However, in light of the recent global environmental problems, there is an increasing demand to adopt a nonpolluting surface-treated steel sheet without recourse to chromate treatment, which is so-called a chromium-free coated steel sheet.

There have been proposed various techniques relating to the chromium-free coated steel sheet. Examples of the techniques include: a technique utilizing a passivation effect of molybdenum acid and tungsten acid that belong to the same Group IVA as chromium acid; a technique of employing a metallic salt of transitional metal such as Ti, Zr, V, Mn, Ni, Co or of rare earth element such as La, Ce; a technique of using, as a base, a chelating agent such as polyvalent phenolic carboxylic acid like tannic acid or a compound including S and N; a technique of forming a polysiloxane coating film using a silane coupling agent; and a technique as a combination of these techniques.

Specific examples of those techniques are as follows:
(1) A technique of forming a coating film from a treatment solution prepared by blending: a coating agent obtained by reacting an organic resin such as polyvinyl phenol derivatives with an acid component and an epoxy compound; a silane coupling agent; a vanadium compound; and the like (see, for example, JP 2003-013252 A, JP 2001-181860 A, JP 2004-263252 A, and JP 2003-155452 A).
(2) A technique of forming a coating film including a water-soluble resin, a thiocarbonyl group, a vanadate compound, and a phosphoric acid (see, for example, JP 3549455 B).
(3) A technique of forming a coating film using a treatment solution containing a metallic (such as Ti) compound, fluorides, and inorganic acid such as a phosphate compounds and organic acid (see JP 3302677 B, JP 2002-

105658 A, JP 2004-183015 A, JP 2003-171778 A, JP 2001-271175 A, JP 2006-213958 A and JP 2005-048199 A).

(4) A technique of forming a composite coating film from rare earth elements such as Ce, La, Y, and Ti, Zr elements and then forming by concentration an oxide layer on a coating interface side and a hydroxide layer on a surface side in the coating film (JP 2001-234358 A), a technique of forming a composite coating film of Ce and Si oxide (JP 3596665 B).

(5) A technique of forming, as an under layer, a phosphate and/or a phosphate compound coating film containing oxide and forming, as an upper layer thereof, an organic composite coating film formed of a resin coating film (see, for example, JP 2002-053980 A and JP 2002-053979 A).

(6) A technique of forming a composite coating film containing a specific inhibitor component and a silica/zirconium compounds (see, for example, JP 2008-169470 A).

(7) A technique of forming a composite coating film containing: a water-soluble zirconium compound; a tetraalkoxysilane; a compound having an epoxy group; a chelating agent; a vanadic acid; and a predetermined metallic compound (JP 2010-255105 A).

The films formed by the above-mentioned techniques are supposed to suppress occurrence of white rust in zinc through combined addition of organic components or inorganic components. For example, according to the techniques of the above-mentioned references (1) and (2), corrosion resistance is ensured by adding, in principle, an organic resin. However, a coating film thus formed of an organic resin fails to exhibit satisfactory continuity. Further, welding dissolves the organic compound, and thus weldability cannot be ensured.

The techniques of the above-mentioned references (3) and (4) propose an inorganic-only film that is completely free of any organic component. However, such a composite film formed by metal oxide and metal hydroxide must be made thick to attain sufficient corrosion resistance as a zinc or zinc alloy coated steel sheet. Further, the techniques of the references (3) and (4) cannot satisfy corrosion resistance as well as conductivity and weldability in a compatible manner because a zinc or zinc alloy coated steel sheet surface thereof is covered with a nonconductive film (insulating film) such as zinc phosphate, which is disadvantageous in terms of attaining excellent conductivity and weldability, as in the case of the techniques of the above-mentioned references (1) and (2).

The technique of the above-mentioned reference (5) is focused on a fact that the conductivity of a surface of a surface-treated steel sheet depends on film thickness of an insulating film covering the surface of the steel sheet, and makes it possible to obtain excellent conductivity by reducing the thickness of the insulating coating film. To reduce the film thickness of the insulating coating film is also preferred in terms of ensuring weldability. However, when the film thickness is reduced, the corrosion resistance of the steel sheet is degraded, thereby making it difficult to obtain a surface-treated steel sheet which is good in all of corrosion resistance, conductivity, and weldability.

The technique of the above-mentioned reference (6) utilizes, as an inhibitor component, a passivation effect of a vanadate compound and a low soluble metallic salt derived from a phosphate compound and forms, as a skeleton of the film, a composite coating film of a zirconium compound, silica particles, and a silane coupling agent, to thereby manifest excellent corrosion resistance. However, to ensure conductivity at higher level as has been conventionally attained through a chromate treatment, the film thickness needs to be reduced, which makes it difficult to satisfy corrosion resistance as well as conductivity and weldability in a compatible manner.

The technique disclosed in the above-mentioned reference (7) is capable of providing a zinc or zinc alloy coated steel sheet having corrosion resistance and adhesion properties, and is excellent in continuity under low contact pressure and corrosion resistance. However, it was found that good weldability could not be attained even with the use of this surface-treated steel sheet.

As described above, in the conventional chromium-free coated steel sheet hitherto proposed, the film thickness of a highly-insulating coating film needs to be increased to reliably obtain as good corrosion resistance as a conventional chromate coating. This inevitably makes it difficult for the conventional chromium-free coated steel sheet to ensure good conductivity and weldability, and therefore, the conventional chromium-free coated steel sheet is hardly satisfactory to be introduced as an alternative technique to chromate treatment. Further, as described above, it is necessary to design the coating film similarly to the conventional chromate coating to ensure the weldability. However, none of the above-mentioned techniques gives any consideration to ensuring good weldability in such a circumstance as described above.

It could therefore be helpful to provide a zinc or zinc alloy coated steel sheet that is not only excellent in corrosion resistance and top coating properties, but also capable of attaining corrosion resistance, continuity, and weldability in a balanced manner without containing chromium compound. It could also be helpful to provide a method of manufacturing the zinc or zinc alloy coated steel sheet and a surface-treatment solution therefor.

SUMMARY

We discovered advantages of forming a surface-treatment film on a zinc or zinc alloy coated steel sheet, the surface-treatment film obtained by:

preparing a surface-treatment solution containing following components by blending the components at specific blending ratios, the components including: a specific silane compound; a zirconium carbonate compound; a vanadate compound; a nitric compound; and water, applying the surface-treatment solution onto a surface of the zinc or zinc alloy coated steel sheet; and heating and drying the surface-treatment solution thus applied. In this manner, we have accomplished this disclosure.

Specifically, we provide:

(1) A surface-treatment solution for a zinc or zinc alloy coated steel sheet, including the following components:
a silane compound (A) having a hydrolyzable group, which is obtained from a silane coupling agent (a1) having a glycidyl group, a tetraalkoxysilane (a2), and a chelating agent (a3);
a zirconium carbonate compound (B);
a vanadate compound (C);
a nitric compound (D); and
water,
the components being controlled to satisfy conditions (I) to (IV) below at pH in a range of 8 to 10,
in which the conditions (I) to (IV) are as follows:
(I) content of the silane compound (A) with respect to the total solid content of the surface-treatment solution is 30 to 70 mass %;

(II) mass ratio (B/A) of the ZrO$_2$-equivalent mass of the zirconium carbonate compound (B) with respect to content of the silane compound (A) is 0.3 to 2.0;

(III) mass ratio (C/A) of the V-equivalent mass of the vanadate compound (C) with respect to content of the silane compound (A) is 0.01 to 0.15; and (IV) mass ratio (D/A) of the content of the nitric compound (D) with respect to the content of the silane compound (A) is 0.005 to 0.08.

(2) A zinc or zinc alloy coated steel sheet, having a surface-treatment film formed thereon, the surface-treatment film being obtained by applying a surface-treatment solution according to (1) above onto a surface of the zinc or zinc alloy coated steel sheet, and then by heating and drying the surface-treatment solution thus applied so that the coating weight per one surface is in the range of 100 to 600 mg/m$^2$.

(3) A method of manufacturing a zinc or zinc-alloy coated steel sheet, including:

applying the surface-treatment solution according to (1) above onto a surface of the zinc or zinc alloy coated steel sheet such that the coating weight per one surface after being dried falls within the range of 100 to 600 mg/m$^2$; and subsequently heating and drying the surface-treatment solution thus applied.

We provide a zinc or zinc alloy coated steel sheet having a surface-treatment film containing, as a main component, a specific inorganic component, the surface-treatment film closely following the surface morphology of the steel sheet to render densely-structured barrier properties and, therefore, being good corrosion resistance, continuity, and weldability that are equivalent to those of a chromate coating. We also provide a method of manufacturing the zinc or zinc alloy coated steel sheet and a surface-treatment solution therefor.

DETAILED DESCRIPTION

Our solutions, steel sheets and methods will be described in further detail hereinafter.

Zinc or Zinc Alloy Coated Steel Sheet

Our zinc or zinc alloy coated steel sheets are not particularly limited, and examples thereof include: a hot-dip galvanized steel sheet (GI) or a galvannealed steel sheet (GA) obtained by alloying the hot-dip galvanized steel sheet (GI); a hot-dip Zn-5 mass % Al alloy coated steel sheet (GF); a hot-dip Zn-55 mass % Al alloy coated steel sheet (GL); an electrogalvanized steel sheet (EG); and a zinc-nickel alloy electroplated steel sheet (Zn-11 mass % Ni), and the like.

The zinc or zinc alloy coated steel sheet has a surface-treatment film formed thereon, the surface-treatment film being obtained by applying a surface-treatment solution to be described later onto a surface of the steel sheet, and then by heating and drying the surface-treatment solution thus applied so that the coating weight per one surface falls within a range of 100 to 600 mg/m$^2$. The steel sheet thus obtained is excellent in corrosion resistance, continuity, and weldability in a balanced manner.

Surface-Treatment Solution for Zinc or Zinc Alloy Coated Steel Sheet

The surface-treatment solution for a zinc or zinc alloy coated steel sheet contains: a silane compound (A) having a hydrolyzable group, which is obtained from a silane coupling agent (a1) having a glycidyl group, a tetraalkoxysilane (a2), and a chelating agent (a3); a zirconium carbonate compound (B); a vanadate compound (C); a nitric compound (D); and water.

The silane compound (A) having a hydrolyzable group in the surface-treatment solution is a compound obtained from a silane coupling agent (a1) having a glycidyl group, a tetraalkoxysilane (a2), and a chelating agent (a3). The silane compound (A) has a hydrolyzable group which forms a direct bond to Si element, and the hydrolyzable group reacts with moisture to form a silanol group. The silane compound (A) may be the one in which all the groups forming a bond to Si element are hydrolyzable groups, or the one in which some of the groups forming a bond to Si element are hydrolyzable groups.

The silane coupling agent (a1) having a glycidyl group is not particularly limited as long as one molecule thereof including Si contains a glycidyl group and, as the hydrolyzable group, a lower alkoxyl group having carbon atoms of 1 to 5, and preferably, 1 to 3. Examples thereof may include: 3-glycidoxypropyltrimethoxysilane; 3-glycidoxypropyltriethoxysilane; 3-glycidoxypropylmethyldimethoxysilane; and 2-(3,4-epoxycyclohexyl)ethyltriethoxysilane.

The tetraalkoxysilane (a2) contains four lower alkoxyl groups as the hydrolyzable groups, and is not particularly limited as long as it can be represented by a general expression Si(OR)$_4$ (in the expression, R represents the same or different alkyl groups having carbon atoms of 1 to 5). Examples thereof may include: tetramethoxysilane; tetraethoxysilane; and tetrapropoxysilane, and at least one or more of these compounds may be used. Among these examples, tetraethoxysilane and tetramethoxysilane are preferable because use thereof results in better corrosion resistance of the zinc or zinc alloy coated steel sheet.

The silane compound (A) having a hydrolyzable group contains a low-condensation product of the aforementioned silane coupling agent (a1) having a glycidyl group and the tetraalkoxysilane (a2). The low-condensation product has, as a main skeleton, a polysiloxane bond formed by the condensation reaction between (a1) and (a2), in which a terminal group forming a bond to Si element may be hydrolyzable group, or part of group forming a bond to Si element may be hydrolyzable group.

A compound having a condensation degree of 2 to 30 may be used as the silane compound (A) having a hydrolyzable group. In particular, a compound having a condensation degree of 2 to 10 may preferably be used. A condensation degree of 30 or less can provide a stable silane compound (A) without forming a white precipitate.

The silane compound (A) having a hydrolyzable group can be obtained by, for example, reacting a low-condensation product of the silane coupling agent (a1) and the tetraalkoxysilane (a2) with the chelating agent (a3) for about 10 minutes to 20 hours at a reaction temperature of 1 to 70° C. and then subjecting the resultant to autoclave. Examples of the chelating agent (a3) may include: monocarboxylic acid such as acetic acid; hydroxy carboxylic acid such as tartaric acid and malic acid; polycarboxylic acid including dicarboxylic acid such as oxalic acid, malonic acid, succinic acid, and adipic acid and tricarboxylic acid such as citric acid; aminocarboxylic acid such as glycine; phosphonic acid and phosphonate, and at least one or more of these chelating agents may be used. In particular, in view of ensuring the storage stability of the surface-treatment solution, a compound including a carboxyl group or a phosphonic group in one molecule is preferably used.

The hydrolyzable group and the condensation state of the silane compound (A) having a hydrolyzable group can be identified through measurements based on gel permission chromatography (GPC), NMR, and IR.

The silane compound (A) having a hydrolyzable group is obtained by reaction of the silane coupling agent (a1) having a glycidyl group, the tetraalkoxysilane (a2), and the chelating agent (a3), in which the silane coupling agent (a1) and the tetraalkoxysilane (a2) are hydrolyzed by water and the chelating agent (a3) so that the chelating agent (a3) is considered to form a coordinate bond with the condensation product of (a1) and (a2), and the hydrolysis and the coordination of the chelating agent (a3) occur substantially simultaneously. The silane compound (A) thus obtained generates a chelate solution that is extremely high in stability in a room temperature range and has good keeping quality.

Further, the chelating agent (a3) is effective to ensure good corrosion resistance and storage stability of the surface-treatment solution. Although the reason therefor is unclear, the chelating agent (a3) is believed to form a coordinate bond with the condensation product of the silane coupling agent (a1) and the tetraalkoxysilane (a2), and is assumed to cause an effect of inhibiting the silane compound (A) from being polymerized in the surface-treatment solution. This effect prevents the surface-treatment solution from being deteriorated in long-term storage after preparation, and maintains the quality unchanged from the time of the preparation thereof. Further, the chelating agent (a3) is also considered to coordinate with the vanadate compound (C) to be described later so that the vanadium is dissolved under corrosive environment to again form a polysiloxane bond. Yet further, the chelating agent (a3) causes a smaller etching effect on a surface of a zinc or zinc alloy coating layer than inorganic acid such as nitric acid, phosphoric acid, sulfuric acid, and hydrofluoric acid, and does not form a nonconductive coating film such as a zinc phosphate coating. Presumably for the reasons described above, a zinc or zinc alloy coated steel sheet having a surface-treatment film formed by using a surface-treatment solution containing the chelating agent (a3) exhibits better weldability than a zinc or zinc alloy coated steel sheet having a surface-treatment film formed otherwise.

Although the blending ratio of the silane coupling agent (a1) having a glycidyl group, the tetraalkoxysilane (a2), and the chelating agent (a3) is not particularly limited, the silane compound may preferably contain: 100 parts by mass of the silane coupling agent (a1); 25 to 75 parts by mass of the tetraalkoxysilane (a2); and 5 to 30 parts by mass of the chelating agent (a3), to flat obtain a zinc or zinc alloy coated steel sheet excellent in corrosion resistance.

The surface-treatment solution contains the silane compound (A) to 30 to 70 mass % with respect to the total solid content of the surface-treatment solution, because the corrosion resistance is deteriorated when the content falls below 30 mass % or exceeds 70 mass %.

The silane compound (A) obtained as described above is mixed with the zirconium carbonate compound (B) so that it will no longer be dissolved in water once dried to exert an effect like a barrier. Examples of the zirconium carbonate compound (B) may include, for example, the salts of the zirconium carbonate compound, such as sodium zirconium, potassium zirconium, lithium zirconium, and ammonium zirconium, and at least one of these compounds may be used, possibly in combination. Among those, ammonium zirconium carbonate is preferred in terms of resistance to water.

The content of the zirconium carbonate compound (B) is adjusted such that a mass ratio (B/A) of mass obtained by converting Zr mass of the zirconium carbonate compound (B) into $ZrO_2$ mass ($ZrO_2$-equivalent mass) with respect to the content of the above-mentioned silane compound (A) falls within the range of 0.3 to 2.0, and preferably within the range of 0.35 to 1.5. This is because the continuity is deteriorated when the mass ratio falls below 0.3 while the corrosion resistance is deteriorated when the mass ratio exceeds 2.0.

The vanadate compound (C) exists in a uniformly dispersed and highly water-soluble state in a coating film formed on a surface of a zinc or zinc alloy coated steel sheet and exhibits a so-called "inhibitor effect" in zinc corrosion. Further, the vanadate compound (C) is believed to coordinate with the chelating agent (a3) so that part of the vanadate compound (C) is ionized under a corrosion environment and passivated, to thereby exhibit excellent corrosion resistance. Examples of the vanadate compound (C) for use include ammonium metavanadate, sodium metavanadate, and vanadium acetylacetonate. At least one of these compounds may be used, possibly in combination.

The content of the vanadate compound (C) is adjusted such that a mass ratio (C/A) of the V-equivalent mass of the vanadate compound (C) with respect to the content of the silane compound (A) is preferably 0.01 to 0.15, and more preferably 0.03 to 0.1. This is because the corrosion resistance is deteriorated when the mass ratio falls below 0.01, while it becomes difficult to dissolve the vanadate compound (C) into the surface-treatment solution when the mass ratio exceeds 0.15.

The nitric compound (D) is blended to form a coating film that closely follows the surface morphology of the zinc or zinc alloy coated steel sheet to render densely-structured barrier properties. The nitric compound (D) serves to activate the surface condition of the zinc or zinc alloy coated steel sheet through oxidoreduction reaction, and has a function of tightly bonding the hydrolyzable group of the silane compound (A) to the steel sheet. As a result, a coating film that follows the surface geometries of the zinc or zinc alloy coated steel sheet can be formed, which is believed to improve weldability. Examples of the nitric compound (D) may include, for example, ammonium salt and alkali metallic salt, and at least one or more of these compounds may be used.

The content of the nitric compound (D) is adjusted such that a mass ratio (D/A) of the content of the nitric compound (D) with respect to the above-mentioned silane compound (A) is 0.005 to 0.08, and preferably 0.01 to 0.05. This is because the weldability is deteriorated when the mass ratio falls below 0.005 while the corrosion resistance is deteriorated when the mass ratio exceeds 0.08.

The surface-treatment solution is required to have a pH value of 8 to 10, and preferably 8.5 to 9.5. When the pH of the surface-treatment solution is less than 8, storage stability of the surface-treatment solution is significantly deteriorated. On the other hand, when the pH exceeds 10 or the surface-treatment solution is made acidic, zinc may be etched too much, possibly deteriorating corrosion resistance and continuity of the zinc or zinc alloy coated steel sheet. Ammonium, amine, a derivative of amine, and aminopolycarboxylic acid may preferably be used as alkali to adjust pH, while acid may preferably be selected from among the above-mentioned chelating agents (a3). In the case of adjusting the pH by using an inorganic acid such as nitric acid, phosphoric acid, sulfuric acid, and hydrofluoric acid, an amount of the inorganic acid to be added may preferably be less than 4 mass % with respect to the total solid content of the surface-treatment solution to eliminate the fear of deteriorating continuity.

The surface-treatment film is adjustingly formed on a surface of the zinc or zinc alloy coating layer such that the coating weight per one surface is 100 to 600 $mg/m^2$, and preferably 200 to 500 $mg/m^2$. When the coating weight falls below 100 $mg/m^2$, the corrosion resistance may become insufficient. When the coating weight exceeds 600 $mg/m^2$, corrosion resistance and other properties may be saturated.

A lubricant may be added to the surface-treatment solution to improve lubrication properties. Examples of the lubricant may include a solid lubricant such as polyethylene wax, oxidized polyethylene wax, oxidized polypropylene wax, carnauba wax, paraffin wax, montan wax, a rice wax, a Teflon® wax, carbon disulfide, and graphite. At least one type of the aforementioned solid lubricants may be used, possibly in combination.

Content of the lubricant is preferably 1 to 10 mass %, and more preferably 3 to 7 mass %, with respect to the total solid content of the surface-treatment solution. When the content of the lubricant is 1 mass % or more, improvement is observed in lubrication properties. When the content of the lubricant is 10 mass % or less, corrosion resistance suffers no deterioration.

Further, a thickening agent, a conductive material that improves conductivity, a coloring pigment for improving design performance, and a solvent that improves film-forming properties, may further be added to the surface-treatment solution according to necessity.

The surface-treatment solution can be obtained by mixing the above-mentioned components in water such as deionized water or distilled water. The concentration of solid content of the surface-treatment solution may be appropriately selected. Further, alcohol, ketone, water-soluble solvent based on cellosolve, defoamer, an antibacterial and antifungal agent, a colorant, and the like may be added to the surface-treatment solution according to necessity. However, it is important that these materials are added only to such an extent that addition thereof does not adversely affect qualities to be obtained. The maximum amount of these additives to be added is preferably less than 5 mass % with respect to the total solid content of the surface-treatment solution.

As described above, a surface-treatment film is formed by applying a surface-treatment solution to a surface of a zinc or zinc alloy coating layer of a zinc or zinc alloy coated steel sheet, and then heating and drying the surface-treatment solution thus applied. Examples of a method of applying the surface-treatment solution onto a zinc or zinc alloy coated steel sheet include: a roll coating method; a bar coating method; a dip coating method; and a spray coating method, and an appropriate method may be selected depending on the shape or the like of a zinc or zinc alloy coated steel sheet to be processed. More specifically, for example, in a case where the zinc or zinc alloy coated steel sheet to be processed is in a sheet shape, a roll coating method or a bar coating method may be employed, or a spray coating method may be employed in which the surface-treatment solution is applied by spray-coating onto the zinc or zinc alloy coated steel sheet and then the application amount of the surface-treatment solution is adjusted by a roll squeeze or gas blown at high pressure. In the case where the zinc or zinc alloy coated steel sheet has already been formed into a product, there may be selected a method in which the product is dipped in the surface-treatment solution, taken out of the solution, and the application amount of the surface-treatment solution may possibly be adjusted by blowing away an excess surface-treatment solution with compressed air.

Before applying the surface-treatment solution onto the zinc or zinc alloy coated steel sheet, the zinc or zinc alloy coated steel sheet may be subjected to a pre-treatment for removing oil and stains from a surface thereof according to necessity. A zinc or zinc alloy coated steel sheet is often coated with anti-rust oil to prevent the steel sheet from rusting. Even if the zinc or zinc alloy coated steel sheet is free of anti-rust oil, the steel sheet still has oil and stains adhered thereon during the production process. In view of this, conducting the aforementioned pre-treatment cleans a surface of the zinc or zinc alloy coating layer, facilitating uniform wetting thereof. Needless to say, the pre-treatment is not particularly needed in a case where a surface of the zinc or zinc alloy coated steel sheet is free of oil and stains and can be uniformly wetted with the surface-treatment solution. The method of the pre-treatment is not particularly limited, and examples thereof may include: hot water rinsing; solvent cleaning; alkaline degreasing cleaning; and the like.

The heating temperature (peak metal temperature) when heat-drying the surface-treatment solution applied on a surface of the zinc or zinc alloy coating layer is not particularly limited, and may generally be 40 to 200° C., and preferably 60 to 180° C. When the heating temperature is equal to or higher than 40° C., no moisture, serving as main solvent, remains in the surface-treatment film. When the heating temperature is equal to or lower than 200° C., the generation of cracks in the surface-treatment film can be suppressed. Accordingly, problems such as deterioration of corrosion resistance of the zinc or zinc alloy coated steel sheet can be prevented from arising. Regarding the heating time, optimum conditions are to be selected depending on the type or the like of a zinc or zinc alloy coated steel sheet to be used. The heating time is set preferably at 0.1 to 60 seconds, and more preferably 1 to 30 seconds, in terms of productivity or the like.

It is possible to obtain a zinc or zinc alloy coated steel sheet that is not only excellent in corrosion resistance and top coating properties, but also capable of attaining corrosion resistance, continuity, and weldability in a balanced manner without containing chromium compound. Although the reason therefor is not necessarily clear enough, such excellent performances are presumably achieved by the following function effects.

First, the silane compound (A) and the zirconium carbonate compound (B), among the components constituting the surface-treatment solution, form a skeleton of a surface-treatment film formed on a surface of the zinc or zinc alloy coating layer. It is assumed that the hydrolyzable group of the silane compound (A) reacts with the steel sheet surface to thereby immobilize the film component and also contributes to three-dimensional cross-linking with the zirconium carbonate (B). Yet further, it is assumed that the glycidyl group of the silane coupling agent (a1) also reacts with the steel sheet surface, which contributes to enhancing binding force of the surface-treatment film. The surface-treatment film thus formed is no longer dissolved in water once dried to exert an effect like a barrier, which provides a zinc or zinc alloy coated steel sheet excellent in corrosion resistance, top coating properties, continuity, and weldability.

The vanadate compound (C) among the components constituting the surface-treatment solution exists in a uniformly dispersed and highly water-soluble state in the surface-treatment film, thereby exhibiting a so-called "inhibitor effect" in zinc corrosion. Specifically, it is assumed that at least part of the vanadate compound (C) is ionized under a corrosion environment and passivated, to thereby suppress corrosion of zinc itself. Further, it is assumed that the vanadate compound (C), which coordinates with the chelating agent (a3), is three-dimensionally cross-linked with the hydrolyzable group of the silane compound (A) after being ionized, thereby mending a defect portion of the surface-treatment film to suppress corrosion of zinc.

In summary, in the surface-treatment film, the following is assumed. That is, the silane compound (A) and the zirconium carbonate compound (B) form a densely-structured surface-treatment film to attain high corrosion resistance while the vanadate compound (C) is contained as a corrosion inhibitor and the nitric compound (D) is further contained to form a densely-structured surface-treatment film that closely follows the surface morphology of the zinc or zinc alloy coated steel sheet, with the result that the balance between the corrosion resistance and the weldability can be maintained.

The zinc or zinc alloy coated steel sheet can be applied to various applications and can be suitably employed, for example, as a material for use in various fields such as architecture, electronics, and automobiles.

EXAMPLES

Next, effects will be described with reference to Examples and Comparative examples. These Examples are provided only for illustrative purpose and by no means restrict this disclosure.

1. Method of Preparing Test Sheet
(1) Sample Sheet (Material)
The following commercially-available materials were used as sample sheets:
   (i) Electrogalvanized steel sheet (EG): sheet thickness 0.8 mm; coating amount of zinc or zinc alloy 20/20 (g/m$^2$)
   (ii) Hot-dip galvanized steel sheet (GI): sheet thickness 0.8 mm; coating amount of zinc or zinc alloy 60/60 (g/m$^2$)
   (iii) Galvannealed steel sheet (GA): sheet thickness 0.8 mm; coating amount of zinc or zinc alloy 40/40 (g/m$^2$).

In these Examples, the coating amount of zinc or zinc alloy represents an amount of zinc or zinc alloy coating on a main surface of each steel sheet. For example, in the case of an electrogalvanized steel sheet, "20/20 (g/m$^2$)" means that the steel sheet has a zinc or zinc alloy coated layer of 20 g/m$^2$ on both surfaces thereof.

(2) Pre-Treatment (Cleaning)
The method of preparing a test piece included: first processing a surface of each of the above-mentioned sample sheets using "PALKLIN N364 S" manufactured by Nihon Parkerizing Co., Ltd., to remove oil and stains from the surface; then washing the surface with tap water to confirm that a metallic material surface is wetted 100% with water; further pouring pure water (deionized water) over the surface; and drying the sample sheet in an oven of 100° C. atmosphere to remove moisture therefrom. The sheet thus obtained is used as a test piece.

(3) Preparation of Surface-Treatment Solution
Components of respective compositions (mass ratios) shown in Table 1 were mixed in water to obtain respective surface-treatment solutions for a zinc or zinc alloy coated steel sheet, the solutions each having a solid content of 15 mass %.

TABLE 1

| | Surface-Treatment Liquid for Zinc or Zinc Alloy Coated Steel Sheet | | | | | | | | |
|---|---|---|---|---|---|---|---|---|---|
| Evaluation Criteria | A Type | B Type | C Type | D Type | A Mass % | B/A Converted Mass Ratio | C/A Converted Mass Ratio | D/A Mass Ratio | pH |
| Example 1 | A2 | B2 | C1 | D1 | 50.1 | 0.54 | 0.055 | 0.010 | 8.5 |
| Example 2 | A3 | B1 | C1 | D1 | 46.1 | 0.61 | 0.082 | 0.015 | 8.5 |
| Example 3 | A2 | B1 | C1 | D1 | 42.2 | 0.81 | 0.041 | 0.015 | 8.5 |
| Example 4 | A1 | B2 | C2 | D1 | 40.9 | 0.81 | 0.082 | 0.011 | 8.5 |
| Example 5 | A2 | B2 | C1 | D1 | 40.8 | 0.81 | 0.082 | 0.015 | 8.5 |
| Example 6 | A1 | B1 | C1 | D1 | 40.8 | 0.81 | 0.082 | 0.015 | 8.5 |
| Example 7 | A2 | B2 | C1 | D1 | 34.5 | 1.09 | 0.109 | 0.020 | 8.5 |
| Example 8 | A2 | B2 | C1 | D1 | 50.1 | 0.54 | 0.055 | 0.010 | 8.5 |
| Example 9 | A2 | B2 | C1 | D1 | 50.1 | 0.54 | 0.055 | 0.010 | 8.5 |
| Example 10 | A2 | B2 | C1 | D2 | 50.1 | 0.54 | 0.055 | 0.010 | 8.5 |
| Example 11 | A2 | B2 | C1 | D1 | 56.5 | 0.41 | 0.041 | 0.007 | 8.5 |
| Example 12 | A3 | B1 | C1 | D1 | 46.1 | 0.61 | 0.082 | 0.015 | 8.5 |
| Example 13 | A3 | B1 | C1 | D1 | 46.1 | 0.61 | 0.082 | 0.015 | 8.5 |
| Example 14 | A3 | B1 | C1 | D2 | 46.1 | 0.61 | 0.082 | 0.015 | 8.5 |
| Example 15 | A3 | B1 | C1 | D1 | 33.2 | 1.22 | 0.082 | 0.015 | 8.5 |
| Example 16 | A2 | B1 | C1 | D1 | 42.9 | 0.81 | 0.020 | 0.015 | 8.5 |
| Example 17 | A2 | B1 | C1 | D1 | 42.9 | 0.81 | 0.020 | 0.015 | 8.5 |
| Example 18 | A2 | B1 | C1 | D2 | 42.9 | 0.81 | 0.020 | 0.015 | 8.5 |
| Example 19 | A2 | B1 | C1 | D1 | 42.2 | 0.81 | 0.041 | 0.015 | 8.5 |
| Example 20 | A2 | B1 | C1 | D1 | 41.5 | 0.81 | 0.061 | 0.015 | 8.5 |
| Example 21 | A2 | B1 | C1 | D1 | 39.5 | 0.81 | 0.123 | 0.015 | 8.5 |
| Example 22 | A1 | B2 | C2 | D1 | 41.0 | 0.81 | 0.082 | 0.007 | 8.5 |
| Example 23 | A1 | B2 | C2 | D1 | 41.0 | 0.81 | 0.082 | 0.007 | 8.5 |
| Example 24 | A1 | B2 | C2 | D1 | 40.9 | 0.81 | 0.082 | 0.011 | 8.5 |
| Example 25 | A1 | B2 | C2 | D1 | 40.3 | 0.81 | 0.082 | 0.044 | 8.5 |
| Example 26 | A1 | B2 | C2 | D1 | 39.9 | 0.81 | 0.082 | 0.074 | 8.5 |
| Example 27 | A3 | B1 | C1 | D1 | 40.8 | 0.81 | 0.082 | 0.015 | 8 |
| Example 28 | A3 | B1 | C1 | D1 | 40.8 | 0.81 | 0.082 | 0.015 | 8.5 |
| Example 29 | A3 | B1 | C1 | D1 | 40.8 | 0.81 | 0.082 | 0.015 | 9.5 |
| Example 30 | A3 | B1 | C1 | D1 | 40.8 | 0.81 | 0.082 | 0.015 | 10 |
| Example 31 | A1 | B1 | C1 | D1 | 40.8 | 0.81 | 0.082 | 0.015 | 8.5 |
| Example 32 | A2 | B1 | C1 | D1 | 40.8 | 0.81 | 0.082 | 0.015 | 8.5 |
| Example 33 | A3 | B1 | C1 | D1 | 40.8 | 0.81 | 0.082 | 0.015 | 8.5 |
| Example 34 | A1 | B2 | C1 | D1 | 40.8 | 0.81 | 0.082 | 0.015 | 8.5 |
| Example 35 | A1 | B1 | C2 | D1 | 40.8 | 0.81 | 0.082 | 0.015 | 8.5 |
| Example 36 | A1 | B1 | C1 | D1 | 40.8 | 0.81 | 0.082 | 0.015 | 8.5 |
| Example 37 | A1 | B1 | C1 | D1 | 40.8 | 0.81 | 0.082 | 0.015 | 8.5 |
| Example 38 | A1 | B1 | C1 | D1 | 40.8 | 0.81 | 0.082 | 0.015 | 8.5 |
| Example 39 | A1 | B1 | C1 | D1 | 40.8 | 0.81 | 0.082 | 0.015 | 8.5 |
| Example 40 | A1 | B1 | C1 | D1 | 40.8 | 0.81 | 0.082 | 0.015 | 8.5 |
| Comparative Example 41 | A1 | B1 | C1 | D1 | 40.8 | 0.81 | 0.082 | 0.015 | 8.5 |
| Comparative Example 42 | — | B1 | C1 | D1 | 0.0 | — | — | — | 8.5 |

TABLE 1-continued

Surface-Treatment Liquid for Zinc or Zinc Alloy Coated Steel Sheet

| Evaluation Criteria | A Type | B Type | C Type | D Type | A Mass % | B/A Converted Mass Ratio | C/A Converted Mass Ratio | D/A Mass Ratio | pH |
|---|---|---|---|---|---|---|---|---|---|
| Comparative Example 43 | A2 | B2 | C1 | D1 | 26.3 | 1.63 | 0.164 | 0.030 | 8.5 |
| Comparative Example 44 | A3 | B1 | C1 | D1 | 62.1 | 0.20 | 0.082 | 0.015 | 8.5 |
| Comparative Example 45 | A3 | B1 | C1 | D1 | 21.3 | 2.44 | 0.082 | 0.015 | 8.5 |
| Comparative Example 46 | A2 | B1 | C1 | D1 | 43.4 | 0.81 | 0.008 | 0.015 | 8.5 |
| Comparative Example 47 | A2 | B1 | C1 | D1 | 29.4 | 0.81 | 0.573 | 0.015 | 8.5 |
| Comparative Example 48 | A1 | B2 | C2 | D1 | 41.0 | 0.81 | 0.082 | 0.004 | 8.5 |
| Comparative Example 49 | A1 | B2 | C2 | D1 | 39.6 | 0.81 | 0.082 | 0.089 | 8.5 |
| Comparative Example 50 | — | B1 | C1 | D1 | 0.0 | — | — | — | 8.5 |
| Comparative Example 51 | A1 | — | C1 | D1 | 75.2 | 0.00 | 0.082 | 0.015 | 8.5 |
| Comparative Example 52 | A1 | B1 | — | D1 | 43.7 | 0.81 | 0.000 | 0.015 | 8.5 |
| Comparative Example 53 | A1 | B1 | C1 | — | 41.1 | 0.81 | 0.082 | 0.000 | 8.5 |
| Comparative Example 54 | A3 | B1 | C1 | D1 | 40.8 | 0.81 | 0.082 | 0.015 | 4 |
| Comparative Example 55 | A3 | B1 | C1 | D1 | 40.8 | 0.81 | 0.082 | 0.015 | 11 |

Hereinafter, the compounds used in Table 1 will be described.

Manufacture of Silane Compound (A)

Preparation Example 1 (Silane Compound A1)

Ammonia water was dropped into a mixture of 3-glycidoxypropyl-trimethoxysilane, tetraethoxysilane, and deionized water to precipitate a silane compound. After cleaning with deionized water, acetic acid serving as the chelating agent was added and stirred, to thereby obtain a silane compound A1.

Preparation Example 2 (Silane Compound A2)

The mixture of 3-glycidoxypropyltrimethoxysilane and tetraethoxysilane was added to the mixture of formic acid serving as the chelating agent and deionized water by dropping while stirring for one hour at 20° C., which was then aged for two hours at 25° C., to thereby obtain a silane compound A2.

Preparation Example 3 (Silane Compound A3)

A silane compound A3 was obtained under the same preparation conditions as those of Preparation Example 2, except in that acetic acid and phosphonic acid were employed in place of the formic acid in the mixture of Preparation Example 2, and the mixture was dropped for one hour at 20° C. and then further aged for one hour at 80° C.

Zirconium Carbonate Compound (B)
  B1: ammonium zirconium carbonate
  B2: sodium zirconium carbonate
Vanadate Compound (C)
  C1: ammonium metavanadate
  C2: vanadyl acetylacetonate (V: 19.2 mass %)
Nitric Compound (D)
  D1: ammonium nitrate
  D2: aluminum nitrate (4) Treatment Method The above-mentioned surface-treatment solution was applied by bar coating or spray coating to each test sheet shown in Table 2. The test sheets were placed in an oven without being washed with water to allow the surface-treatment solution to be dried in the oven at a drying temperature shown in Table 2 so that a surface-treatment film with a coating weight (per one surface) shown in Table 2 was formed on both surfaces thereof. The drying temperature was adjusted in accordance with the ambient temperature in the oven and the time during which the test sheet stayed in the oven. In each of the Examples and Comparative Examples, the drying temperature corresponds to the peak metal temperature at a surface of the test sheet. The bar coating and the spray coating were specifically performed as follows.

Bar coating: The surface-treatment solution was applied dropwise to each test sheet and coated thereon using a #3-#5 bar coater. The # number of the bar coater for use and the concentration of the surface-treatment solution were adjusted to attain a predetermined coating weight shown in Table 2.

Spray coating: The surface-treatment solution was applied by spray coating onto each test sheet, and the coating weight was adjusted using a roll coater. The roll coating conditions and the concentration of the surface-treatment solution were adjusted to attain a predetermined coating weight shown in Table 2.

TABLE 2

| | | Treatment Method | | |
|---|---|---|---|---|
| Evaluation Criteria | Test Sheet Type | Coating Method Type | Coating Weight mg/m$^2$ | Drying Temperature ° C. |
| Example 1 | (i) | Bar Coating | 250 | 140 |
| Example 2 | (i) | Bar Coating | 250 | 140 |
| Example 3 | (i) | Bar Coating | 250 | 140 |
| Example 4 | (i) | Bar Coating | 250 | 140 |
| Example 5 | (i) | Bar Coating | 250 | 140 |
| Example 6 | (i) | Bar Coating | 250 | 140 |
| Example 7 | (ii) | Spray | 250 | 60 |
| Example 8 | (ii) | Spray | 250 | 60 |
| Example 9 | (iii) | Spray | 250 | 60 |
| Example 10 | (ii) | Spray | 250 | 60 |
| Example 11 | (ii) | Spray | 250 | 60 |
| Example 12 | (ii) | Spray | 250 | 60 |
| Example 13 | (iii) | Spray | 250 | 60 |
| Example 14 | (ii) | Spray | 250 | 60 |
| Example 15 | (ii) | Spray | 250 | 60 |
| Example 16 | (ii) | Spray | 250 | 60 |
| Example 17 | (iii) | Spray | 250 | 60 |
| Example 18 | (ii) | Spray | 250 | 60 |
| Example 19 | (ii) | Spray | 250 | 60 |
| Example 20 | (ii) | Spray | 250 | 60 |
| Example 21 | (ii) | Spray | 250 | 60 |
| Example 22 | (ii) | Spray | 250 | 60 |
| Example 23 | (iii) | Spray | 250 | 60 |
| Example 24 | (ii) | Spray | 250 | 60 |

TABLE 2-continued

| Evaluation Criteria | Test Sheet Type | Treatment Method | | |
|---|---|---|---|---|
| | | Coating Method Type | Coating Weight mg/m² | Drying Temperature ° C. |
| Example 25 | (ii) | Spray | 250 | 60 |
| Example 26 | (ii) | Spray | 250 | 60 |
| Example 27 | (ii) | Spray | 250 | 60 |
| Example 28 | (ii) | Spray | 250 | 60 |
| Example 29 | (ii) | Spray | 250 | 60 |
| Example 30 | (ii) | Spray | 250 | 60 |
| Example 31 | (ii) | Spray | 250 | 60 |
| Example 32 | (ii) | Spray | 250 | 60 |
| Example 33 | (ii) | Spray | 250 | 60 |
| Example 34 | (ii) | Spray | 250 | 60 |
| Example 35 | (ii) | Spray | 250 | 60 |
| Example 36 | (ii) | Spray | 250 | 60 |
| Example 37 | (ii) | Spray | 100 | 60 |
| Example 38 | (ii) | Spray | 200 | 60 |
| Example 39 | (ii) | Spray | 250 | 60 |
| Example 40 | (ii) | Spray | 600 | 60 |
| Comparative Example 41 | (ii) | Spray | 50 | 60 |
| Comparative Example 42 | (i) | Bar Coating | 250 | 140 |
| Comparative Example 43 | (ii) | Spray | 250 | 60 |
| Comparative Example 44 | (ii) | Spray | 250 | 60 |
| Comparative Example 45 | (ii) | Spray | 250 | 60 |
| Comparative Example 46 | (ii) | Spray | 250 | 60 |
| Comparative Example 47 | (ii) | Spray | 250 | 60 |
| Comparative Example 48 | (ii) | Spray | 250 | 60 |
| Comparative Example 49 | (ii) | Spray | 250 | 60 |
| Comparative Example 50 | (ii) | Spray | 250 | 60 |
| Comparative Example 51 | (ii) | Spray | 250 | 60 |
| Comparative Example 52 | (ii) | Spray | 250 | 60 |
| Comparative Example 53 | (ii) | Spray | 250 | 60 |
| Comparative Example 54 | (ii) | Spray | 250 | 60 |
| Comparative Example 55 | (ii) | Spray | 250 | 60 |

(5) Evaluation Method (5-1) Evaluation of Corrosion Resistance

A test piece in a size of 70×150 mm was cut out from each sample sheet having the aforementioned surface-treatment film formed thereon. The rear surface and the edges of each test piece thus cut out were sealed by vinyl tapes and the test piece was subjected to a salt spray test (SST) according to JIS-Z-2371-2000. Corrosion resistance was evaluated by measuring the time elapsed until a white rust area ratio reached 5%. The evaluation criteria are as follows.

Evaluation Criteria:
  Excellent: 240 hours or more before the white rust area ratio reached 5%
  Good: 120 hours or more and less than 240 hours before the white rust area ratio reached 5%
  Moderate: 72 hours or more and less than 120 hours before the white rust area ratio reached 5%
  Poor: less than 72 hours before the white rust area ratio reached 5%

(5-2) Evaluation of Top Coating Properties

A test piece in a size of 70×150 mm was cut out from each sample sheet having the aforementioned surface-treatment film formed thereon, and commercially available melamine alkyd paint was applied to each test piece such that paint thickness on the test piece after being baked for 30 minutes at 140° C. was 30 µm. Thereafter, the test piece was immersed in boiling water for 2 hours and then a surface of the test piece was cut with a cutter in a lattice pattern such that the cutting reached the base steel and eventually formed one hundred 1 mm×1 mm squares in the test piece surface. The test piece was extruded by 5 mm using an Erichsen extruder with the cut portion of the sample piece facing outside (front side). The Erichsen extrusion conditions were set according to JIS-Z-2247-2006 (Erichsen value: IE), with the punch diameter: 20 mm, the die diameter: 27 mm, and the drawing width: 27 mm. After the Erichsen extrusion, the test piece was subjected to tape peeling test for analyzing a remaining state of the paint film to evaluate top coating properties (adhesion properties) of the sheet. The evaluation criteria are as follows.

Evaluation Criteria:
  Excellent: No peeling or peeled area being less than 5%
  Good: Peeled area being 5% to 10% (inclusive of 5% and exclusive of 10%)
  Moderate: Peeled area being 10% to 20% (inclusive of 10% and exclusive of 20%)
  Poor: Peeled area being 20% or more (5-3) Evaluation of Weldability A test piece in a size of 70×150 mm was cut out from each sample sheet having the aforementioned surface-treatment film formed thereon, and the number of welds in continuous spot welding was investigated for two sample materials of the same type under the following welding conditions. The welding current value employed in the investigation of the continuous spot weldability was an average of two current values, namely, a current value: I1 (kA) and a welding current value: I2 (kA), which are capable of obtaining a nugget diameter represented by $4\sqrt{t}$ with a sheet thickness of t (mm). The number of welds that were made until the nugget diameter becomes smaller than $4\sqrt{t}$ was counted as the number of welds in continuous spot welding.

(Welding Conditions)
  Electrode: CF type
  Tip Diameter: 4.5 mmϕ
  Tip Angle: 120°
  Outer Diameter: 13 mmϕ
  Material: Cu—Cr
  Current-Carrying Time Period: 10 cycles
  Welding Pressure: 1667 N (170 kgf)
  Welding Pressure Conditions (before energization: 30 cycles/after energization: 7 cycles)
  Excellent: 2,000 or more
  Good: 1,000 or more and less than 2,000
  Moderate: 500 or more and less than 1,000
  Poor: less than 500

(5-4) Evaluation of Continuity

Surface resistivity was measured for each of the above-mentioned test piece by using Loresta-GP/ESP probe manufactured by Mitsubishi Chemical Analytec Co., Ltd. Specifically, surface resistivity was measured by stepwisely increasing load exerted on the probe with increments of 50 g and determining the minimum load at which the surface resistivity was equal to or smaller than $10^{-4} \Omega$, to thereby measure the continuity.

Excellent: Average load of 10 measurements points is less than 350 g
  Good: Average load of 10 measurements points is 350 g or more and less than 800 g
  Moderate: Average load of 10 measurements points is 800 g or more and less than 950 g
  Poor: Average load of 10 measurements points is 950 g or more (5-5) Evaluation of Storage Stability Each of the surface-treatment solutions having the component composition shown in Table 1 was stored in a thermostat chamber of 40° C. for 30 days and then the appearance of the surface-treatment solution was visually inspected for evaluation.

Excellent: No change
  Good: Very small amount of precipitation was observed.

Moderate: Small amount of precipitation was observed or viscosity was slightly increased.

Poor: Large amount of precipitation or a gelation was observed.

The zinc or zinc alloy coated steel sheets obtained by applying the surface-treatment solutions of Examples and Comparative Examples were subjected to the aforementioned evaluations (5-1) to (5-5). The results thereof are shown in Table 3.

TABLE 3

| Evaluation Criteria | Corrosion Resistance | Top Coating Properties | Weldability | Continuity | Storage Stability |
|---|---|---|---|---|---|
| Example 1 | Excellent | Excellent | Excellent | Excellent | Excellent |
| Example 2 | Excellent | Excellent | Excellent | Excellent | Excellent |
| Example 3 | Excellent | Excellent | Excellent | Excellent | Excellent |
| Example 4 | Excellent | Excellent | Excellent | Excellent | Excellent |
| Example 5 | Excellent | Excellent | Excellent | Excellent | Excellent |
| Example 6 | Excellent | Excellent | Excellent | Excellent | Excellent |
| Example 7 | Good | Good | Excellent | Excellent | Excellent |
| Example 8 | Excellent | Excellent | Excellent | Excellent | Excellent |
| Example 9 | Excellent | Excellent | Excellent | Excellent | Excellent |
| Example 10 | Excellent | Excellent | Good | Excellent | Excellent |
| Example 11 | Excellent | Excellent | Excellent | Excellent | Excellent |
| Example 12 | Excellent | Excellent | Excellent | Excellent | Excellent |
| Example 13 | Excellent | Excellent | Excellent | Excellent | Excellent |
| Example 14 | Excellent | Excellent | Good | Excellent | Excellent |
| Example 15 | Excellent | Excellent | Excellent | Excellent | Excellent |
| Example 16 | Good | Excellent | Excellent | Excellent | Excellent |
| Example 17 | Good | Excellent | Excellent | Excellent | Excellent |
| Example 18 | Good | Excellent | Good | Excellent | Excellent |
| Example 19 | Excellent | Excellent | Excellent | Excellent | Excellent |
| Example 20 | Excellent | Excellent | Excellent | Excellent | Excellent |
| Example 21 | Excellent | Excellent | Excellent | Excellent | Good |
| Example 22 | Excellent | Excellent | Good | Excellent | Excellent |
| Example 23 | Excellent | Excellent | Good | Excellent | Excellent |
| Example 24 | Excellent | Excellent | Excellent | Excellent | Excellent |
| Example 25 | Excellent | Excellent | Excellent | Excellent | Excellent |
| Example 26 | Good | Excellent | Excellent | Excellent | Excellent |
| Example 27 | Good | Excellent | Excellent | Good | Excellent |
| Example 28 | Excellent | Excellent | Excellent | Excellent | Excellent |
| Example 29 | Excellent | Excellent | Excellent | Excellent | Excellent |
| Example 30 | Good | Excellent | Excellent | Excellent | Excellent |
| Example 31 | Excellent | Excellent | Excellent | Excellent | Excellent |
| Example 32 | Excellent | Excellent | Excellent | Excellent | Excellent |
| Example 33 | Excellent | Excellent | Excellent | Excellent | Excellent |
| Example 34 | Excellent | Excellent | Excellent | Excellent | Excellent |
| Example 35 | Excellent | Excellent | Excellent | Excellent | Excellent |
| Example 36 | Excellent | Excellent | Excellent | Excellent | Excellent |
| Example 37 | Good | Excellent | Excellent | Excellent | Excellent |
| Example 38 | Excellent | Excellent | Excellent | Excellent | Excellent |
| Example 39 | Excellent | Excellent | Excellent | Excellent | Excellent |
| Example 40 | Excellent | Excellent | Excellent | Excellent | Excellent |
| Comparative Example 41 | Poor | Excellent | Excellent | Excellent | Excellent |
| Comparative Example 42 | Poor | Moderate | Moderate | Excellent | Excellent |
| Comparative Example 43 | Poor | Good | Good | Good | Good |
| Comparative Example 44 | Moderate | Good | Good | Poor | Good |
| Comparative Example 45 | Poor | Good | Moderate | Good | Good |
| Comparative Example 46 | Poor | Good | Good | Good | Excellent |
| Comparative Example 47 | | | unevaluable | | Poor |
| Comparative Example 48 | Good | Good | Poor | Good | Excellent |
| Comparative Example 49 | Poor | Good | Good | Excellent | Excellent |
| Comparative Example 50 | Poor | Moderate | Moderate | Excellent | Excellent |
| Comparative Example 51 | Poor | Good | Moderate | Poor | Excellent |
| Comparative Example 52 | Poor | Good | Good | Excellent | Excellent |
| Comparative Example 53 | Moderate | Good | Poor | Good | Excellent |
| Comparative Example 54 | Poor | Excellent | Excellent | Poor | Excellent |
| Comparative Example 55 | Poor | Excellent | Excellent | Poor | Poor |

As shown in Table 3, each of our zinc or zinc alloy coated steel sheets is not only excellent in corrosion resistance and top coating properties, but also capable of attaining corrosion resistance, continuity, and weldability in a balanced manner without containing chromium compound, and our surface-treatment solution is also excellent in storage stability. In contrast, Comparative Examples having requirements falling out of our range were insufficient in any of corrosion resistance, top coating properties, continuity, and weldability. Further, Comparative Example 47 contained too much of the vanadate compound to be dissolved in the surface-treatment solution. Hence, the surface-treatment solution could not be prepared. Therefore, the evaluation of a sample material having a surface-treatment film formed thereon could not be performed for Comparative Example 47.

Industrial Applicability

It is possible to provide a zinc or zinc alloy coated steel sheet that is not only excellent in corrosion resistance and top coating properties, but also capable of attaining corrosion resistance, continuity, and weldability in a balanced manner without containing chromium compound. We also provide a method of manufacturing the zinc or zinc alloy coated steel sheet and a surface-treatment solution therefor. Therefore, the zinc or zinc alloy coated steel sheet is extremely suited for use in applications such as automobile parts, household electric parts, and office automation (OA) equipment parts.

The invention claimed is:

1. A surface-treatment solution for a zinc or zinc alloy coated steel sheet, comprising:
   a silane compound (A) having a hydrolyzable group, the silane compound (A) being obtained from a silane coupling agent (a1) having a glycidyl group, a tetraalkoxysilane (a2), and a chelating agent (a3);
   a zirconium carbonate compound (B);
   a vanadate compound (C);
   a nitrate compound (D) selected from the group consisting of at least one of ammonium salt and alkali metal salt; and
   water,
   and satisfying (I) to (IV) below, the surface treatment solution having pH of 8 to 10, wherein (I) to (IV) are as follows:
   (I) content of the silane compound (A) with respect to total solid content of the surface-treatment solution is 30 to 70 mass %;
   (II) mass ratio (B/A) of the $ZrO_2$-equivalent mass of the zirconium carbonate compound (B) with respect to the content of the silane compound (A) is 0.3 to 2.0;

(III) mass ratio (C/A) of the V-equivalent mass of the vanadate compound (C) with respect to the content of the silane compound (A) is 0.01 to 0.15; and (IV) mass ratio (D/A) of the content of the nitrate compound (D) with respect to the content of the silane compound (A) is 0.005 to 0.08.

2. A method of manufacturing a zinc or zinc-alloy coated steel sheet comprising:

applying the surface-treatment solution according to claim 1 onto a surface of the zinc or zinc alloy coated steel sheet such that the coating weight per one surface after being dried is 100 to 600 mg/m$^2$; and subsequently heating and drying the surface-treatment solution thus applied.

* * * * *